United States Patent
Amey

(10) Patent No.: US 7,731,787 B2
(45) Date of Patent: Jun. 8, 2010

(54) STABILIZATION OF TRIPHENYLBORON-PYRIDINE

(75) Inventor: Ronald L. Amey, Wilmington, DE (US)

(73) Assignee: Invista North America S.A. R.L., Wilmington, DE (US)

( * ) Notice: Subject to any disclaimer, the term of this patent is extended or adjusted under 35 U.S.C. 154(b) by 0 days.

(21) Appl. No.: 12/436,169

(22) Filed: May 6, 2009

(65) Prior Publication Data

US 2009/0283010 A1    Nov. 19, 2009

Related U.S. Application Data

(60) Provisional application No. 61/052,936, filed on May 13, 2008.

(51) Int. Cl.
 *A01N 55/08* (2006.01)
 *A01N 33/00* (2006.01)
 *A01N 33/16* (2006.01)
 *C07D 211/80* (2006.01)
 *C07D 211/82* (2006.01)
 *C07D 211/90* (2006.01)
 *C07D 211/86* (2006.01)

(52) U.S. Cl. .................. 106/18.3; 514/64; 514/315; 546/13

(58) Field of Classification Search ............... 106/18.3; 514/64, 315; 546/13
See application file for complete search history.

(56) References Cited

U.S. PATENT DOCUMENTS

| 3,211,679 | A | 10/1965 | Updegraff |
| 4,303,444 | A | 12/1981 | Warnez |
| 7,045,560 | B2 | 5/2006 | Yamamori et al. |
| 7,517,985 | B2 * | 4/2009 | Ostermaier et al. ........... 546/13 |
| 2007/0225397 | A1 | 9/2007 | Nasvadba et al. |
| 2007/0299259 | A1 | 12/2007 | Ostermaier et al. |
| 2008/0154039 | A1 * | 6/2008 | Ostermaier .................. 546/13 |

FOREIGN PATENT DOCUMENTS

| JP | 08-080529 | | 3/1996 |
| JP | 9-3366 A | * | 1/1997 |
| JP | 10-77202 A | * | 3/1998 |
| JP | 2000-143417 A | * | 5/2000 |
| WO | WO01/42313 | | 6/2001 |

OTHER PUBLICATIONS

The Handbook of Environmental Chemistry, O. Hutzinger, Editor-in-Chief, vol. 5, pp. 194-195.

* cited by examiner

*Primary Examiner*—Anthony J Green

(57) ABSTRACT

A method for stabilizing triphenylboron-pyridine (TPBP) in a solvent-based anti-fouling coating, such as a marine anti-fouling coating, by adding to the coating about 0.04 to about 0.40% wt., based on the total amount of the triphenylboron-pyridine, of 2,2,6,6-tetramethylpiperidinyl-1-oxy-radical ("TEMPO"). Also disclosed is a solvent-based anti-fouling coating, such as a marine anti-fouling coating, composition containing TPBP and TEMPO.

22 Claims, No Drawings

STABILIZATION OF TRIPHENYLBORON-PYRIDINE

CROSS-REFERENCE TO RELATED APPLICATION

This application claims benefit of priority from Provisional Application No. 61/052,936, filed May 13, 2008. This application hereby incorporates by reference Provisional Application No. 61/052,936 in its entirety.

FIELD OF THE INVENTION

The invention relates to the use of 2,2,6,6-tetramethylpiperidinyl-1-oxy-radical ("TEMPO") as a stabilizer for triphenylboron-pyridine ("TPBP"), used as a biocide in solvent-based marine anti-fouling coatings.

BACKGROUND OF THE INVENTION

Triphenylboron-pyridine is known to be an effective biocide for a variety of applications, particularly in commercially valuable marine anti-fouling coatings. See, for example, U.S. Pat. No. 3,211,679, U.S. Patent Publication No. 2007/0299259, U.S. Pat. No. 7,045,560 and JP 08-052908 (all four being incorporated herein by reference). Such solvent-based anti-fouling coatings generally contain xylene or similar aromatic solvents, utilize a variety of acrylate resin systems to form the basis of the coating, and contain one or more biocides, such as TPBP, which preferably should remain active and stable for extended periods of storage, particularly at elevated temperatures. There is some indication in published literature that under certain conditions TPBP may generate low levels of benzene. For example, in The Handbook of Environmental Chemistry, Hutzinger, Editor-in-Chief, Vol. 5, Ioannis K. Konstantinou, Volume Editor, *Antifouling Paint Biocides*, pp. 194-195, Springer-Verlag, Berlin, Heidelberg, 2005, states that the photodegradation of TPBP was studied by Amey and Waldron in aerated artificial seawater, using UV irradiation. The photodegradation of TPBP and primary intermediate photoproducts of mono- and di-phenylboron acids was rapid. The secondary by-products, pyridine, phenol, and benzene were also observed.

Nasvadba et al., U.S. Patent Publication No. 2007/0225397, proposes the use of stable, highly sterically hindered nitroxyl radicals, defined by the specific formulae, as in-can stabilizers for UV-curable resins. The term "highly sterically hindered" is defined to mean that ring nitroxyl radicals of the formulas are more hindered than ring nitroxyl radicals having 4 methyl groups in the alpha position to the N-atom, for example more hindered than TEMPO (2,2,6,6-tetra-methylpiperidinyl-1-oxy-radical). Nasvadba et al. also state that WO01/42313 proposes the use of sterically hindered nitroxyl radicals, such as TEMPO, for stabilization of UV-curable resins.

Warnez, U.S. Pat. No. 4,303,444, proposed a method for inhibiting benzene formation in resin-based anti-fouling paints, by adding trialkyl tin oxide or hydroxide to the paints.

SUMMARY OF THE INVENTION

When a solvent-based anti-fouling coating containing triphenylboron-pyridine (TPBP) is exposed to long term storage, particularly in a closed container, it is expected that benzene may be generated over a period of time. The coating is usually used for marine applications, i.e., to coat surfaces of boats and similar vessels immersed in water. Without wishing to be bound by any operability theory, it is believed that the generation of benzene is likely to reduce the efficacy of the TPBP as a biocide, and may create a potential occupational exposure hazard during application of the coating, e.g., in a shipyard. Furthermore, due to regulatory issues, it is advantageous to maintain benzene concentration in a container containing such coating at or below about 0.1% by volume. Thus, a maximum level of about 0.1% benzene in the vapor or head space of a storage container that contains a coating system which includes TPBP is desirable from both a regulatory and worker safety viewpoint.

It would therefore be advantageous to provide a means to maintain the benzene concentration in a closed container containing such an anti-fouling coating at about 0.1% by volume or less.

It might have been expected that any of the stabilizers known in the prior art for use in the stabilization of coating systems and their additives should function substantially equally well in the presence of TPBP or similar biocides. However, I have surprisingly found that a sterically hindered nitroxyl radical 2,2,6,6-tetramethylpiperidinyl-1-oxy-radical of formula 1, below, wherein each R is a methyl group (TEMPO), is the only stabilizer which provides the necessary level of stabilization required to meet the maximum level of about 0.1% by volume benzene generation during extended storage of a coating formulation which includes TPBP.

Formula 1

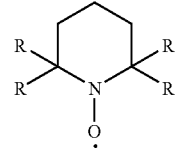

Thus, the addition of TEMPO to such coating systems minimizes or eliminates the generation of benzene.

In one aspect, the invention is directed to a method for stabilizing triphenylboron-pyridine in a solvent-based anti-fouling coating. The method comprises adding to the coating from about 0.04 weight percent to about 0.40% wt., based on the total amount of the triphenylboron-pyridine, of a sterically hindered nitroxyl radical of formula 1.

In another embodiment, the invention is directed to a solvent-based anti-fouling coating composition comprising triphenylboron-pyridine and about 0.04 weight percent to about 0.40% wt., based on the total amount of the triphenylboron-pyridine, of a sterically hindered nitroxyl radical of formula 1.

The invention is also directed to a method of controlling the content of benzene in a container which contains a solvent-based anti-fouling coating composition comprising triphenylboron-pyridine. This method comprises adding to the coating composition about 0.04 to about 0.40% wt., based on the total amount of the triphenylboron-pyridine, of the sterically hindered nitroxyl radical of formula 1.

In one embodiment, the invention is directed to a container which includes a solvent-based anti-fouling coating composition comprising triphenylboron-pyridine. The coating composition comprises about 0.04 to about 0.40% wt. of the sterically hindered nitroxyl radical of formula 1, based on the total amount of the triphenylboron-pyridine in the composition. The head space in the container includes not more than about 0.1%, such as 0.1% by volume of benzene.

The invention provides a means of stabilizing TPBP in coatings formulations during extended storage at elevated temperatures.

The coating compositions are usually used for marine applications.

DETAILED DESCRIPTION

In this application, whenever a composition or a group of elements is preceded with the transitional phrase "comprising", it is understood that I also contemplate the same composition or group of elements with transitional phrases "consisting essentially of", "consisting", "selected from the group of consisting of", or "is" preceding the recitation of the composition or elements and vice versa.

All numerical values in this disclosure are understood as being modified by "about". All singular forms of ingredients, chemicals, compositions or other components described herein including (without limitations) components of the compositions are understood to include plural forms thereof and vice versa.

The terms "a solvent-based anti-fouling coating", "a solvent-based marine anti-fouling coating", "a solvent-based coating", "anti-fouling coatings" "coating systems" a "formulation" and/or similar expressions are used interchangeably herein to designate film-forming vehicles, usually water-insoluble, such as paints and varnishes, which can be used to coat structures, particularly marine structures, that are susceptible to fouling by marine organisms. Such film-forming vehicles are known in the art. Suitable anti-fouling coatings include paints and varnishes, such as spar varnishes or vinyl acetate-vinyl chloride copolymer based paints and similar compositions, described, for example in Updegraff et al., U.S. Pat. No. 3,211,679, incorporated herein by reference. The anti-fouling coatings that can be used with this invention further include those based on acrylate resins, generally referred to as acrylate-based coatings, e.g., see Yamamori et al., U.S. Pat. No. 7,045,560, also incorporated herein by reference. Such acrylate-based coatings include a varnish comprised of a metal-containing acrylic resin, and a metal-containing acrylic resin, per se, as described in Yamamori et al. The varnish has a non-volatile fraction of not less than 40 weight % and a viscosity at 25° C. of not more than 18 poise, and the anti-fouling coating has a volatile organic compound (VOC) content of not more than 400 g/L. The acrylic resin has in its side chain at least one group represented by formula (2).

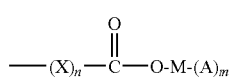

Formula 2 wherein X represents a group of the formula:

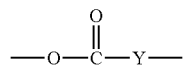

n represents 0 or 1; Y represents a hydrocarbon group; M represents a metal; m represents an integer equal to [(the valence number of metal M)-1]; A represents an organic acid residue derived from a monobasic acid.

The acrylic resin may have 5 to 100 mole % of the organic acid residue derived from a monobasic acid, which is the residue of a cyclic organic acid.

The coating systems may include other conventional ingredients, such as a plasticizer, a thinner, a drier, a thickener, a pigment, dyes and the like.

The solvent(s) used in the solvent-based anti-fouling coating(s) described herein include any solvent(s) used in such formulations, such as various hydrocarbons, e.g., toluene, xylene or mixed xylenes, ethylbenzene, cyclopentane, octane, heptane, cyclohexane, white spirit, and similar solvents; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, diethylene glycol monoethyl ether, and similar solvents; esters such as butyl acetate, propyl acetate, benzyl acetate, ethylene glycol monomethyl ether acetate, ethylene glycol monoethyl ether acetate, and similar solvents; ketones such as ethyl isobutyl ketone, methyl isobutyl ketone, and similar solvents; and alcohols such as n-butanol and propyl alcohols and similar solvents.

TEMPO may be added to the formulation as a stabilizer at levels from about 0.04 weight percent to about 0.40 weight percent (% wt.), such as about 0.04 weight percent to about 0.35% wt., about 0.04 weight percent to about 0.30% wt., about 0.04 weight percent to about 0.25% wt., about 0.04 weight percent to about 0.20% wt., about 0.1% wt., or 0.25% wt., relative to the total weight of TPBP contained in the coating formulation. TEMPO may be added to the coating formulation in any suitable manner, e.g., it may be added directly as a solid to a mixture of TPBP and a solvent or solvents, such as xylene or mixed xylenes, it may be added as a solution to the mixture of TPBP and a solvent or solvents, e.g., xylene or mixed xylenes, by first dissolving the TEMPO in a suitable solvent, such as xylene or mixed xylenes, or it may be added by first blending the solid TEMPO with solid TPBP or other solid additives such as pigments, UV-stabilizers, co-biocides, fillers, anti-sagging agents, and anti-settling agents. If TEMPO is added in the form of the solid blend, the solid blend may be added to a suitable solvent, such as xylene or mixed xylenes, or to the overall coating formulation. In addition to xylene or mixed xylenes, the solvent(s) used with the addition of TEMPO may include any of the solvents described herein for use in the solvent-based anti-fouling coatings of this invention. The coating may comprise about 0.1 to about 60 wt. %, such as about 1 to about 40 wt. %, about 3 to about 10 wt. %, or about 10 wt. % of the TPBP.

EXAMPLES

TPBP (Borocide® P, registered trademark of INVISTA S.ár.l.) was used in all experiments at 10 weight percent relative to the total formulation. Mixed xylenes, benzene-free, were obtained from Avocado Organics, Inc. Mixtures of TPBP and test stabilizers in mixed xylenes were used as models for actual coating formulations in order to clearly identify the effects of the stabilizers on benzene generation from TPBP. All experiments were carried out at 45° C., in air, without stirring, to mimic in-can storage of the formulation. Vapor samples of the head space (the area above the liquid surface) were taken periodically using a gas-tight syringe and then analyzed for the presence of benzene by gas chromatography on a DB-1701 capillary GC column. A benzene concentration of about 0.1 volume percent or less, such as 0.1 volume percent or less, after a minimum of 40 hours at 45° C. is required for a compound to be considered a suitable stabilizer. The examples in the table below show the use of TEMPO and the comparative examples show the unsuitability of other known stabilizers for this system. All stabilizers were tested at 0.1 weight percent relative to the total, contained amount of TPBP at 45° C., unless otherwise noted in the table below.

| | BENZENE %, GC | TIME, HOURS |
|---|---|---|
| EXAMPLES | | |
| TEMPO | 0.06 | 69.5 |
| TEMPO 0.05 WEIGHT % | 0.1 | 67 |
| TEMPO 0.25 WEIGHT % | 0.1 | 72 |
| TEMPO 25° C. | 0.05 | 71 |
| COMPARATIVE EXAMPLES | | |
| NO STABILIZER | 0.4 | 53 |
| 4-METHOXY-TEMPO | 0.13 | 22 |
| 4-OXO-TEMPO | 0.16 | 22 |
| TEMPO ON SILICA GEL 1 WEIGHT % TOTAL | 0.19 | 45 |
| BENZOQUINONE | 0.11 | 23 |
| GALVINOXYL | 0.3 | 46.5 |
| T-BUTYLCATECHOL | 0.59 | 22 |
| BHT | 0.21 | 51 |
| TRIS(2,4-DI-TERT-BUTYLPHENOL)PHOSPHITE | 0.45 | 21 |
| 2,2,6,6(TETRAMETHYL-4-PIPERIDYL)SEBACATE | 0.63 | 22 |

All documents described or mentioned herein are incorporated by reference herein in their entirety, including any priority documents and/or testing procedures to the extent they are not inconsistent with this specification.

As is apparent from the foregoing general description and the specific embodiments, while forms of the disclosure have been illustrated and described, various modifications can be made without departing from the spirit and scope thereof. Accordingly, it is not intended that the invention be limited thereby.

The invention claimed is:

1. A method for the stabilization of triphenylboron-pyridine in a solvent-based anti-fouling coating which comprises adding to the coating from about 0.04 weight percent to about 0.40% wt., based on the total amount of the triphenylboron-pyridine, of a sterically hindered nitroxyl radical of formula 1

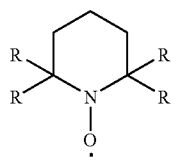

Formula 1 wherein each R is a methyl group.

2. A method of claim 1, wherein from about 0.04 to about 0.35% wt., based on the total amount of the triphenylboron-pyridine, of the sterically hindered nitroxyl radical of formula 1, is added to the coating.

3. A method of claim 1, wherein from about 0.04 to about 0.30% wt., based on the total amount of the triphenylboron-pyridine, of the sterically hindered nitroxyl radical of formula 1, is added to the coating.

4. A method of claim 1, wherein from about 0.04 to about 0.20% wt., based on the total amount of the triphenylboron-pyridine, of the sterically hindered nitroxyl radical of formula 1, is added to the coating.

5. A method of claim 1, wherein about 0.1% wt., based on the total amount of the triphenylboron-pyridine, of the sterically hindered nitroxyl radical of formula 1, is added to the coating.

6. A method of claim 1 wherein the coating comprises about 0.1 to about 60% wt. of the triphenylboron-pyridine.

7. A method of claim 1, wherein the coating comprises about 1 to about 40% wt. of the triphenylboron-pyridine.

8. A method of claim 1, wherein the coating comprises about 3 to about 10% wt. of the triphenylboron-pyridine 9. A method of claim 1, wherein the coating comprises about 10% wt. of the triphenylboron-pyridine.

10. A method of claim 1, wherein the coating is a solvent-based marine anti-fouling coating.

11. A solvent-based anti-fouling coating composition comprising triphenylboron-pyridine and about 0.04 wt % percent to about 0.40% wt., based on the total amount of the triphenylboron-pyridine, of a sterically hindered nitroxyl radical of formula 1

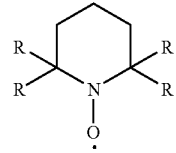

Formula 1 wherein each R is a methyl group.

12. A coating composition of claim 11, which is stored in a container.

13. A coating composition of claim 12, wherein the head space in the container comprises not more than about 0.1% by volume of benzene.

14. A coating composition of claims 11, which comprises from about 0.04 to about 0.35% wt., based on the total amount of the triphenylboron-pyridine, of the sterically hindered nitroxyl radical of formula 1.

15. A coating composition of claim 11, which comprises from about 0.04 to about 0.30% wt., based on the total amount of the triphenylboron-pyridine, of the sterically hindered nitroxyl radical of formula 1.

16. A coating composition of claim 11, which comprises from about 0.04 to about 0.20% wt., based on the total amount of the triphenylboron-pyridine, of the sterically hindered nitroxyl radical of formula 1.

17. A coating composition of claims 11, which comprises about 0.1% wt., based on the total amount of the triphenylboron-pyridine, of the sterically hindered nitroxyl radical of formula 1.

18. A coating composition of claim 11 which comprises about 0.1 to about 60% wt. of the triphenylboron-pyridine.

19. A coating composition of claim 11 which comprises about 1 to about 40% wt. of the triphenylboron-pyridine.

20. A coating composition of claim 11 which comprises about 3 to about 10% wt. of the triphenylboron-pyridine 21. A coating composition of claim 11 which comprises about 10% wt. of the triphenylboron-pyridine.

22. A coating composition of claim 11, wherein the coating composition is a solvent-based marine anti-fouling coating.

* * * * *